United States Patent [19]
Bottomley et al.

[11] Patent Number: 6,139,982
[45] Date of Patent: Oct. 31, 2000

[54] MAGNETIC RECORDING MEDIUM HAVING A BINDER SYSTEM INCLUDING A POLYURETHANE POLYMER HAVING BOTH PHOSPHONATE AND QUATERNARY AMMONIUM PENDANT GROUPS

[75] Inventors: William E. Bottomley, Essex; Philip I. Mayo, Bradford, both of United Kingdom; Ruth M. Erkkila, Lilydale, Minn.

[73] Assignee: Imation Corp., Oakdale, Minn.

[21] Appl. No.: 09/187,824

[22] Filed: Nov. 6, 1998

[51] Int. Cl.$^7$ .......................................... G11B 5/66
[52] U.S. Cl. .................. 428/694 BG; 428/425.9; 428/694 BU; 428/702; 428/900
[58] Field of Search ..................... 428/694 BG, 694 BU, 428/900, 702, 425.9

[56] References Cited

U.S. PATENT DOCUMENTS

| | | |
|---|---|---|
| 4,244,987 | 1/1981 | Aydin et al. . |
| 4,529,661 | 7/1985 | Ninomiya et al. . |
| 4,612,244 | 9/1986 | Kaneda et al. . |
| 4,770,941 | 9/1988 | Imai et al. . |
| 4,784,913 | 11/1988 | Nakamura et al. . |
| 4,784,914 | 11/1988 | Matsufuji et al. . |
| 4,830,923 | 5/1989 | Sumiya et al. . |
| 4,837,082 | 6/1989 | Harrell et al. . |
| 4,842,942 | 6/1989 | Yatsuka et al. . |
| 4,861,683 | 8/1989 | Nakachi et al. . |
| 4,876,149 | 10/1989 | Ramharack . |
| 5,008,357 | 4/1991 | Nakachi et al. . |
| 5,028,676 | 7/1991 | Nakachi et al. . |
| 5,064,730 | 11/1991 | Takano et al. . |
| 5,096,774 | 3/1992 | Sano et al. . |
| 5,098,783 | 3/1992 | Watanabe et al. . |
| 5,126,202 | 6/1992 | Inaba et al. . |
| 5,139,892 | 8/1992 | Nakachi et al. . |
| 5,482,777 | 1/1996 | Yamakawa et al. . |
| 5,491,029 | 2/1996 | Evans et al. . |
| 5,501,903 | 3/1996 | Erkkila et al. . |
| 5,712,345 | 1/1998 | Erkkila et al. . |

FOREIGN PATENT DOCUMENTS

| | | |
|---|---|---|
| 54-46518 | 4/1979 | Japan . |
| 54-46519 | 4/1979 | Japan . |
| 54-84708 | 7/1979 | Japan . |
| 62-30162 | 2/1987 | Japan . |

OTHER PUBLICATIONS

Abstract of JP01073523A published Aug. 17, 1989.
Abstract of JP01106324A published Apr. 24, 1989.
Abstract of JP02012613A published Jan. 17, 1990.
Abstract of JP02053219A published Feb. 22, 1990.
Abstract of JP3041618 published Feb. 22, 1991.
Abstract of JP3141018 published Jun. 17, 1991.
Abstract of JP3203020 published Sep. 4, 1991.
Abstract of JP3224130A published Oct. 3, 1991.
Abstract of JP3224129A published Oct. 3, 1991.
Abstract of JP3224128A published Oct. 3, 1991.
Abstract of JP86026132 published Jun. 19, 1986.

*Primary Examiner*—Bernard Pianalto
*Attorney, Agent, or Firm*—Amelia A. Buharin; Michael S. Sherrill

[57] ABSTRACT

A magnetic recording medium comprising a magnetic layer provided upon a major surface of a substrate, wherein the magnetic layer includes a magnetic pigment, and a polymeric binder system containing a polyurethane having (1) a plurality of pendant phosphonate ester groups effective for promoting wetting of the magnetic pigment by the polymeric binder system, and (2) at least one quaternary ammonium group effective for promoting wetting of the magnetic pigment by the polymeric binder system.

14 Claims, No Drawings

6,139,982

MAGNETIC RECORDING MEDIUM HAVING A BINDER SYSTEM INCLUDING A POLYURETHANE POLYMER HAVING BOTH PHOSPHONATE AND QUATERNARY AMMONIUM PENDANT GROUPS

FIELD OF THE INVENTION

The invention broadly relates to magnetic recording media and polymeric binders useful as magnetic recording medium coatings.

BACKGROUND

Magnetic recording media generally comprise a magnetic layer coated onto at least one side of a nonmagnetizable substrate. A conventional magnetic recording media, known as particulate magnetic recording media, has a magnetic layer comprised of a magnetic pigment dispersed in a polymeric binder. The magnetic layer may also include other components such as lubricants, abrasives, thermal stabilizers, catalysts, crosslinkers, antioxidants, dispersants, wetting agents, fungicides, bactericides, surfactants, antistatic agents, nonmagnetic pigments, coating aids, and the like.

Some forms of magnetic recording media, such as magnetic recording tape, may also have a backside coating applied to the other side of the nonmagnetizable substrate in order to improve the durability, conductivity, and tracking characteristics of the media. Conventional backside coating include a polymeric binder and other components such as nonmagnetic pigments (e.g., carbon black), lubricants, abrasives, thermal stabilizers, catalysts, crosslinkers, antioxidants, dispersants, wetting agents, fungicides, bactericides, surfactants, antistatic agents, coating aids, and the like.

The polymeric binders of the magnetic layer and the backside coating are commonly derived from curable polymers capable of providing the magnetic recording media with appropriate physical and electromagnetic properties when cured. To prepare such media, the components of the magnetic layer or the backside coating are dispersed in a suitable solvent and the resulting dispersion coated onto the nonmagnetizable substrate, dried, optionally calendered, and cured.

Polymeric binders used in the manufacture of magnetic recording media are most commonly blends of a hard resin component (i.e., a polymer with a relatively high glass transition temperature and modulus), and a soft resin component, (i.e., a polymer with relatively low glass transition temperature and modulus). For example, JP 01-073523A and U.S. Pat. No. 4,837,082 disclose that the soft and hard resin components of a polymeric binder must be selected properly in order to maintain flexibility whilst ensuring that the resulting cross-linked polymer matrix has the required tensile strength and modulus.

Hard Resin Component

Copolymers based on vinyl chloride or vinylidene chloride are widely used as the hard component of choice, particularly when the soft resin component is a polyurethane. Such copolymers are generally highly miscible in and compatible with polyurethanes, and possess a relatively high glass transition temperatures, moduli, and hardness. For example, Japanese Publication No. 61-26132 describes the use of vinyl chloride/vinyl acetate/vinyl alcohol copolymers as a polymeric binder component in magnetic recording media.

A drawback associated with the use of vinyl chloride or vinylidene chloride copolymers as the hard resin component in a polymeric binder is the tendency of such copolymers to degrade over time, resulting in the release of highly corrosive gaseous HCl and a change in the properties of the media. Accordingly, some investigators have described various nonhalogenated vinyl copolymers for use in magnetic recording media. See, e.g., U.S. Pat. Nos. 5,501,903, 5,098, 783, 4,876,149, and 4,837,082, and Japanese Publication Nos. SHO 62-30162, SHO 54-84708, SHO 54-46519, and SHO 54-46518.

Soft Resin Component

Polyurethane polymers are widely used as the soft component.

Dispersants

Magnetic pigments tend to agglomerate and can be difficult to initially disperse in the polymeric binder. In addition, magnetic pigments have a propensity to settle within polymeric binders over time. In order to facilitate dispersion of the pigments and stabilize the resulting dispersion, low molecular weight wetting agents, or dispersants, are often employed. Greater amounts of wetting agent or dispersant may be required when higher pigment loadings are employed (i.e., greater amounts by weight of magnetic pigment) and/or smaller pigment particles are employed (i.e., increased surface area). This is not always desirable. Dispersants may plasticize a binder systems and can decrease the modulus of the system. In addition, excess dispersant may exude from a cured binder system over time, leading to changes in the properties of the media and contamination of a recording head.

Self-Wetting Polymers

In an effort to reduce or eliminate the need for dispersants, polymeric binders formed from "self-wetting" polymers have been developed. "Self-wetting" polymers are polymers having pendant dispersing groups effective for facilitating dispersion of a magnetic pigment within the polymer. Representative examples of dispersing groups include quaternary ammonium groups, amines, heterocyclic moieties, salts or acids based on sulfate, salts or acids based on sulfonate, salts or acids based on phosphate, salts or acids based on phosphonate, and salts or acids based on carboxyl, as well as mixtures thereof.

Use of self-wetting polymers generally reduces the amount of dispersant and/or wetting agent required to disperse the magnetic and/or nonmagnetic pigments in the polymeric binder.

SELF-WETTING HARD RESINS

Self-wetting vinyl chloride copolymers are well known and have been described in several United States Patents, including U.S. Pat. Nos. 5,139,892, 5,126,202, 5,098,783, 5,064,730, 5,028,676, 5,008,357, 4,861,683, 4,784,913, 4,770,941, and 4,244,987.

SELF-WETTING SOFT RESINS

Self-wetting polyurethanes have been proposed, including polyurethanes having a phosphorous-based wetting functionality, referenced herein as "P functional" polyurethanes. The phosphorus functionality can be pendant to the main polymer chain or an integral part of the chain. Self-wetting P-functional polyurethanes are disclosed in JP 01-106324A, JP 02-053219A, and U.S. Pat. Nos. 5,501,903, 5,491,029, 4,612,244 and 4,842,942.

Several patents disclose polyurethanes with both phosphorous-based and hydroxy functionalities at sites other than at chain ends. For example, JP 02-012613A describes P functional polyurethanes with tertiary hydroxy functionality at positions other than chain ends.

SELF-WETTING POLYMERIC BINDERS

There are several types of polymeric binder blends containing self-wetting polymers. These can be divided into three groups: (a) self-wetting polyurethanes with "non-wetting" hard resins, (b) "non-wetting" polyurethanes with self-wetting hard resins, and (c) polyurethanes and hard resins which both contain polar wetting functionalities.

Examples from group (a) combine self-wetting polyurethanes with halogenated and nonhalogenated vinyl polymer hard resins. JP 02-012613 discloses self-wetting polyurethanes blended with vinyl chloride/vinyl acetate, vinyl chloride/vinyl propionate, thermoplastic polyurethanes, cellulose polymers, thermoplastic polyesters, epoxy resins, and phenolic resins. U.S. Pat. No. 5,501,903 discloses self-wetting phosphonated polyurethanes blended with nonhalogenated vinyl polymers. Other examples of such blended polymeric binders can be found in JP 3224130A, JP 3224129A, JP 3224128A and U.S. Pat. No. 4,529,661.

Examples from group (b) combine polyurethanes with self-wetting vinyl polymer hard resins. U.S. Pat. No. 5,151,330 discloses a polymeric binder including a polyurethane resin containing polycaprolactone units and a self-wetting vinyl chloride resin containing various polar groups, such as phosphonic and phosphoric acids and salts. Other examples are described in JP 3041618 and U.S. Pat. No. 5,096,774.

Examples from group (c) combine a polyurethane and a hard resin component wherein both contain polar groups effective for promoting wetting and dispersion of a pigment within the polymeric binder. The polar group of choice is generally a sulfur-based or phosphorous-based acid or salt. JP 3203020 discloses a polymeric binder including a combination of a vinyl chloride, cellulose derivative or polyester resin and a polyurethane or polyester resin, with each of the resins containing a polar group selected from $SO_3M$, COOM or $PO(OM)_2$, wherein M is hydrogen, an alkali metal, or ammonium. U.S. Pat. No. 5,491,029 discloses a polymeric binder including a combination of a phosphonated polyurethane and a vinyl chloride copolymer having pendant ammonium functionalities. Other patents which disclose such polymeric binders include JP 3141018, and U.S. Pat. Nos. 4,830,923 and 4,784,914.

While polymeric binder systems including a self-wetting hard and/or soft resin component provide a significant advance over previous polymeric binder systems, a continuing need exists for improved self-wetting polymers capable of forming a polymeric binder system having improved performance characteristics, such as an improved modulus, Tg, and smoothness.

SUMMARY OF THE INVENTION

We have discovered a magnetic recording medium having superior pigment dispersion. The medium comprises: (i) a nonmagnetizable substrate having first and second major surfaces, and (ii) a magnetic layer provided upon the first major surface of the substrate, wherein the magnetic layer includes (A) a magnetic pigment, and (B) a polymeric binder system including at least a polyurethane having (1) a plurality of pendant phosphonate ester groups effective for promoting wetting of the magnetic pigment by the polymeric binder system, and (2) at least one quaternary ammonium group effective for promoting wetting of the magnetic pigment by the polymeric binder system.

The polymeric binder system may further include a hard resin component selected from halogenated and nonhalogenated vinyl polymers and copolymers.

The magnetic recording medium may further include a nonmagnetic layer provided upon the second major surface of the substrate, wherein the nonmagnetic layer includes at least: (i) a nonmagnetic pigment, and (ii) a polymeric binder system, such as the polymeric binder system described above.

DETAILED DESCRIPTION OF THE INVENTION

INCLUDING A BEST MODE

Nomenclature

As used herein, including the claims, the phrase "dispersing group", when used to describe a pendant group on the hard resin component of a polymeric binder, references a chemical moiety capable of wetting a magnetic and/or nonmagnetic pigment dispersed within the polymeric binder.

As used herein, including the claims, the term "nondispersing", when used to describe a monomer, means a monomer bearing no dispersing group and bearing no hydroxyl group.

As used herein, including the claims, the term "glass transition temperature", or "Tg", refers to the temperature at which the material changes from a hard, glassy material to a rubbery, or viscous, material. Values for Tg are determined by differential scanning calorimetry.

As used herein, including the claims, the term "nonhalogenated", when used to describe a polymeric material, means that the polymeric material contains no covalently bound halogen atoms. Thus, the term "nonhalogenated" excludes vinyl halide monomers, such as vinyl chloride or vinylidene chloride, as monomeric components of the copolymer, but does not exclude monomeric components such as methacryloxy oxyethyl trimethyl ammonium chloride in which chlorine is present as a chloride anion.

As used herein, including the claims, the phrase "inert atmosphere" means an atmosphere comprising nitrogen or a noble gas and having an oxygen content of less than 500 parts per million.

Although used interchangeably, the terms "layer" and "coating", when used as the noun, will generally be used to refer to a coated composition on the magnetic and backside surfaces, respectively, of a substrate.

As used herein, including the claims, the prefix "(meth)acryl-" means "methacryl-" or "acryl-".

As used herein, including the claims, the term "vinyl", when used to describe a polymeric material, means that the material includes repeating units derived from vinyl monomers. As used with respect to a vinyl monomer, the term "vinyl" means that the monomer contains a moiety having a free-radically polymerizable carbon-carbon double bond. Monomers having such moieties are capable of copolymerization with each other via the carbon-carbon double bonds.

Magnetic Layer

The magnetic layer includes a magnetic pigment dispersed in the polymeric binder. The magnetic layer may optionally also include one or more conventional additives. Typically, the magnetic layer includes approximately 100 parts by weight magnetic pigment and approximately 5 to 40 parts by weight polymeric binder.

Polymeric Binder

The polymeric binder of the magnetic layer includes a soft resin component and optionally a hard resin component as described herein. When a hard resin component is provided, the weight ratio of hard resin to soft resin should generally be between about 1:19 to 19:1, preferably between about 1:5 to 5:1, and most preferably between 4:6 to 6:4.

Hard Resin Component

The hard resin component may be selected from any of the conventional hard resins used in the formation of polymeric binders, including both halogenated and nonhalogenated resins.

Halogenated Resins

Copolymers based on vinyl chloride or vinylidene chloride can be used as the hard component in the polymeric binder system. Suitable vinyl chloride resins may be prepared by copolymerization of vinyl chloride with comonomers such as vinyl esters, vinyl ethers, acrylonitrile, vinylidene chloride, maleic acid, maleic anhydride, styrene, allyl derivatives, etc.

The halogenated hard resin preferably has a Tg higher than the quaternized and phosphonated polyurethane, more specifically greater than 30° C., and most preferably greater than 40° C.

Nonhalogenated Resins

Composition

A preferred hard resin component is a nonhalogenated vinyl copolymer having a plurality of pendant nitrite groups, a plurality of pendant hydroxyl groups, and at least one pendant dispersing group. It is believed that the nitrite group promotes compatibility of the vinyl copolymers with phosphonated and quaternized polyurethanes of the type described herein.

Pendant nitrite groups can be introduced into the vinyl copolymer by simply incorporating a nonhalogenated vinyl monomer having at least one nitrite functional group into the copolymer. Representative examples of such nitrite functional vinyl monomers include (meth)acrylonitrile, β-cyanoethyl-(meth)acrylate, 2-cyanoethoxyethyl (meth) acrylate, p-cyanostyrene, and p-(cyanomethyl)styrene. Preferably, the nitrite functional, nonhalogenated vinyl monomer is (meth)acrylonitrile, and more preferably acrylonitrile.

Pendant hydroxy groups can be introduced into the vinyl copolymer by simply incorporating a nonhalogenated vinyl monomer having at least one hydroxy functional group into the copolymer. Representative examples of such hydroxy functional vinyl monomers include: esters of an α,β-unsaturated carboxylic acid with a diol, such as 2-hydroxyethyl (meth)acrylate and 2-hydroxypropyl (meth) acrylate; 1,3-dihydroxypropyl-2-(meth)acrylate; 2,3-dihydroxypropyl-1-(meth)acrylate; adducts of an α,β-unsaturated carboxylic acid with caprolactone; alkanol vinyl ethers, such as 2-hydroxyethyl vinyl ether; 4-vinylbenzyl alcohols; allyl alcohols; p-methylol styrene; and the like.

Preferred nonhalogenated, hydroxyl functional, vinyl monomers include 2-hydroxyethyl (meth)acrylate, 2-hydroxypropyl (meth)acrylate, and mixtures thereof. Alternatively, vinyl copolymers with pendant hydroxyl groups can be prepared by incorporating vinyl acetate into the vinyl copolymer and then partially or fully hydrolyzing the acetate moieties to produce pendant hydroxyl groups.

It is believed that the pendant hydroxyl groups of the vinyl copolymer not only facilitate dispersion and interaction of the pigment in the polymeric binder, but also promote solubility, cure, and compatibility with other polymers. The hydroxyl groups can be primary, secondary, or tertiary, although primary and secondary hydroxyl groups are preferred. Generally, preferred vinyl copolymers have a hydroxy equivalent weight of about 300 to 10,000, preferably about 500 to 5000, and more preferably about 800 to 1500.

Representative examples of suitable dispersing groups include quaternary ammonium moieties (e.g., —N(CH$_3$)$_3^+$ Cl$^-$), amines (e.g., —N(CH$_3$)$_2$), heterocyclic moieties as described in U.S. Pat. No. 5,081,213, sulfobetaines (e.g., —N$^+$(CH$_3$)$_2$(CH$_2$CH$_2$CH$_2$SO$_3^{31}$ )), salts or acids based on sulfate (e.g., —OSO$_3$Na), salts or acids based on sulfonate (e.g., —SO$_3$Na), salts or acids based on phosphate (e.g., —OPO(OH)$_2$), salts or acids based on phosphonate (e.g., —PO(OH)$_2$), salts or acids based on carboxyl (e.g.,—COONa), and mixtures thereof. Preferred dispersing groups are groups that are ionized or ionizable at pHs between about 2 to 10.

One or more dispersing groups can be introduced into the vinyl copolymer in a variety of ways. As one approach, initiators containing dispersing groups can be used. Initiators containing dispersing groups initiate copolymerization of vinyl monomers and provide the vinyl copolymers with dispersing groups. Examples of initiators containing dispersing groups include 4,4'-azobis(cyanovaleric acid), succinic acid peroxide, potassium persulfate, and sodium perphosphate. Another approach for introducing the dispersing group into the vinyl copolymer is to use a functional chain transfer agent, such as mercaptosuccinic acid, during copolymerization of the vinyl monomers.

The dispersing group can also be introduced into the vinyl by simply incorporating a nonhalogenated, vinyl monomer bearing a dispersing group into the copolymer. Representative examples of such nonhalogenated, vinyl monomers bearing a dispersing group include (meth)acryloxy oxyethyl trimethyl ammonium chloride, (meth)acryloxy oxyethyl acid phosphate, (meth)acrylamidopropyl trimethylammonium chloride, (meth)acryloxy oxypropyl dimethylbenzylammonium chloride, vinylbenzyl trimethylammonium chloride, 2-hydroxy-3-allyloxypropyl trimethylammonium chloride, (meth)acrylamidopropyl sodium sulfonate, sodium styrene sulfonate, styrene sulfonic acid, (meth)acrylic acid, maleic acid, fumaric acid, maleic anhydride, vinyl sulfonic acid, 2-(meth)acrylamide-2-methyl-1-propanesulfonic acid, dimethylaminoethyl (meth)acrylate, maleic anhydride, N-(3-sulfopropyl)-N-(meth)acryloyloxyethyl-N,N-dimethylammonium betaine, 2-[(meth)acryloyloxy]ethyl trimethylammonium methosulfate, N-(3-sulfopropyl)-N-(meth)acrylamidopropyl-N, N-dimethylammonium betaine, vinylbenzyl trimethylammonium chloride, and mixtures thereof.

A dispersing group can also be introduced into the vinyl copolymer using suitable polymer reactions. Examples of suitable polymer reactions capable of providing a dispersing group include: (1) reaction of succinic anhydride with a portion of the hydroxyl groups on the vinyl copolymer to produce a vinyl copolymer with pendant acid functionality; and (2) incorporation of a nonhalogenated, epoxy functional vinyl monomer into the vinyl copolymer with subsequent reaction of a tertiary amine with the epoxy groups to produce pendant quaternary ammonium groups on the vinyl copolymer. Suitable nonhalogenated, epoxy functional vinyl monomers capable of being incorporated into the vinyl copolymer include specifically, but not exclusively, glycidyl ethers of unsaturated alcohols, such as allyl glycidyl ether, and glycidyl ester such as glycidyl (meth)acrylate.

The dispersing group promotes the dispersion of pigment in the polymeric binder. In those instances wherein the vinyl copolymer includes more than one dispersing group, the dispersing groups can be the same or different. Generally, preferred vinyl copolymers have a dispersing group equivalent weight of about 2,000 to 100,000, preferably about 5,000 to about 50,000.

The vinyl copolymer preferably also includes a nonhalogenated, nondispersing, vinyl monomer. Representative examples of suitable copolymerizable, nonhalogenated, nondispersing, vinyl monomers include styrene; alkylated styrenes; alkoxy styrenes; vinyl naphthalene; alkylated vinyl naphthalenes; alkoxy vinyl naphthalenes; (meth)acrylamides; N-vinyl pyrolidone; linear, branched, or alicyclic alkyl esters of (meth)acrylic acid wherein the alkyl groups contain from 1 to 20, preferably 1 to 8, carbon atoms, such as methyl (meth)acrylate, n-butyl (meth)acrylate, t-butyl (meth)acrylate, ethyl (meth)acrylate, isopropyl (meth)acrylate, and 2-ethylhexyl (meth)acrylate;

vinyl esters of alkanoic acids wherein the alkyl moiety of the alkanoic acids contain 2 to 20, preferably 2 to 4, carbon atoms and can be linear, branched, or alicyclic; isobornyl (meth)acrylate; glycidyl (meth)acrylate vinyl acetate; allyl (meth)acrylate, and the like. Preferred nonhalogenated, nondispersing, vinyl monomers include styrene, alkyl-substituted styrenes, alkyl (meth)acrylates wherein the alkyl group contains 1 to 4 carbon atoms, and mixtures thereof Most preferably, the nonhalogenated, nondispersing, vinyl monomer is selected from styrene, methyl methacrylate, ethyl methacrylate, and mixtures thereof Preferred vinyl copolymers are copolymers of (i) (meth) acrylonitrile; (ii) a nonhalogenated, hydroxyl functional, vinyl monomer, (iii) a nonhalogenated, vinyl monomer bearing a dispersing group, and (iv) one or more nonhalogenated, nondispersing, vinyl monomers.

A particularly preferred nonhalogenated vinyl copolymer (hereinafter referenced as the "Preferred Vinyl Copolymer") is a nonhalogenated vinyl copolymer of monomers comprising (i) 5 to 40, preferably 15 to 40, parts by weight of (meth)acrylonitrile, (ii) 1 to 30 parts by weight of a nonhalogenated, hydroxyl functional, vinyl monomer,(iii) 0.25 to 10, preferably 0.25 to 5, most preferably 0.5 to 2, parts by weight of a nonhalogenated, vinyl monomer bearing a dispersing group, and (iv) 30 to 80 parts by weight of one or more nonhalogenated, nondispersing, vinyl monomers.

The Preferred Vinyl Copolymer is preferably formed with a vinyl monomer bearing a dispersing group having a dispersing group selected from quaternary ammonium, carboxylic acid or salts thereof, phosphoric acid or salts thereof, phosphonic acid or salts thereof, sulfuric acid or salts thereof, sulfonic acid or salts thereof, and mixtures thereof. More preferably, the dispersing group is quaternary ammonium. A specifically preferred vinyl monomer bearing a dispersing group is (meth)acryloxy oxyethyl trimethyl ammonium chloride.

Preferably, the nonhalogenated, nondispersing, vinyl monomer of the Preferred Vinyl Copolymer is styrene.

Synthesis

Nonhalogenated vinyl copolymers useful in the present invention can be prepared by free-radical polymerization methods known in the art, including but not limited to bulk solution, emulsion and suspension polymerization methods. For example, in accordance with standard solution polymerization methods, the nonhalogenated vinyl copolymer can be prepared by (i) dissolving the desired monomers in an appropriate solvent, (ii) adding a chain-transfer agent, a free-radical polymerization initiator, and other additives known in the art, (iii) maintaining the solution under an inert atmosphere such as nitrogen or argon, (iv) agitating the solution, and (v) maintaining the solution at a temperature sufficient to activate the initiator.

Solvents useful in such solution polymerizations vary according to the solubility of the monomers and additives used. Typical solvents include ketones such as acetone, methyl ethyl ketone, 3-pentanone, methyl isobutyl ketone, diisobutyl ketone, and cyclohexanone; alcohols such as methanol, ethanol, propanol, n-butanol, isopropanol, isobutanol, cyclohexanol and methyl cyclohexanol; esters such as ethyl acetate, butyl acetate, isobutyl acetate, isopropyl acetate, and the like; aromatic hydrocarbons such as benzene, toluene, xylenes, cresol, and the like; ethers such as diisopropyl ether, diisobutyl ether, tetrahydrofuran, tetrahydropyran, and dioxane; and aprotic solvents such as dimethylformamide, dimethylsulfoxide and the like, and cosolvent systems of such solvents. A generally preferred solvent is methyl ethyl ketone (MEK) as the monomers and additives used in the synthesis of the Preferred Vinyl Copolymer are sufficiently soluble in MEK, and MEK is the preferred medium in which the magnetic dispersions, into which the resultant vinyl copolymers are added, are prepared.

Chain transfer agents suitable for solution polymerization of the vinyl monomers include specifically, but are not exclusively, alcohols, mercaptans, certain halogenated small molecules, and mixtures thereof Preferred chain transfer agents include carbon tetrabromide, isooctylthioglycolate, mercaptosuccinic acid, mercaptopropane diol, dodecyl mercaptan, ethanol and carbon tetrachloride. Most preferably, the chain transfer agent is mercaptopropane diol.

Free-radical polymerization initiators suitable for use in solution polymerization include thermally activated initiators that are soluble in the reaction solvent. Typically suitable free-radical polymerization initiators including specifically, but not exclusively, azo compounds, peroxides, and mixtures thereof. Specifically useful peroxide initiators include benzoyl peroxide, lauroyl peroxide, di-t-butyl peroxide, and mixtures thereof Specifically useful azo compound initiators include 2,2'-azobis(2-methylbutyronitrile), 2,2'azobis(isobutyronitrile), and 2,2'-azobis(2,4-dimethylpentanenitrile), each of which is commercially available as VAZO 67™, VAZO 64™, and VAZO 52™, respectively, from E. I. DuPont de Nemours and Co. A preferred thermal polymerization initiator is VAZO 64™ brand initiator because of its ease of use and excellent half-life (e.g., at 64° C. the half-life of VAZO 64™) is 10 hours).

The nonhalogenated vinyl copolymers of the present invention can also be conveniently prepared by standard emulsion polymerization methods. In accordance with standard emulsion polymerization methods, the nonhalogenated vinyl copolymer can be prepared by (i) preparing an emulsion of the desired monomers, a chain-transfer agent and a water-soluble redox-type initiator system, (ii) maintaining the emulsion under an inert atmosphere such as nitrogen or argon, (iii) agitating the emulsion, (iv) heating the emulsion until a reaction exotherm occurs, and then (v) cooling and collecting the resulting latex. Optionally, a anionic, cationic or nonionic surfactant can be added to the reaction mixture.

Oxidation-reduction ("Redox") free-radical initiators useful in such emulsion polymerization methods include specifically, but not exclusively, tertiary amines with organic peroxides (exemplified by the N, N-diethylaniline-benzoyl peroxide pair); organic halides with transition metal complexes (exemplified by the carbon tetrachloride-molybdenum hexacarbonyl pair); inorganic oxidation-reduction systems (exemplified by the potassium persulfate—sodium metabisulfite pair); and organic-inorganic systems (exemplified by the 2-mercaptoethanol-$Fe^{+3}$ pair). Inorganic redox initiators are generally preferred for use in the present invention because of their ease of handling and useful reaction temperature range.

Soft Resin Component

The soft resin component is a polyurethane polymer having (i) a plurality of pendant phosphonate ester groups effective for promoting wetting of the magnetic pigment by the polymeric binder system, and (ii) at least one quaternary ammonium group effective for promoting wetting of the magnetic pigment by the polymeric binder system.

In a preferred embodiment, the soft resin component comprises a phosphonated and quaternized polyurethane having (i) a plurality of phosphonate units of the formula:

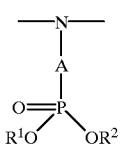

in which:
(A) the nitrogen atom forms part of the backbone chain of the polymer,
(B) A represents a single bond or divalent linking group, and
(C) $R^1$ and $R^2$ independently represent an alkyl group, a cycloalkyl group, an aryl group or together comprise the necessary carbon atoms to complete a ring; and
(ii) at least one quaternary ammonium unit of the formula:

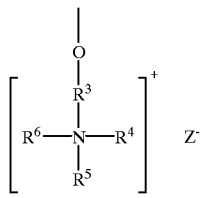

in which:
(A) $R^3$ is a divalent carbon-containing chain,
(B) $R^4$, $R^5$ and $R^6$ independently represent an alkyl group, a cycloalkyl group, an aryl group, and an arylalkyl group, preferably an alkyl group containing 1 to 4 carbon atoms, and
(C) $Z^-$ represents an anion.

"A" is preferably a non-interfering linking group comprising 1 to 4, preferably 1 to 3, and most preferably 1 or 2 linear carbon atoms. "Non-interfering", when used in this respect, refers to a linking group that does not unduly limit the usefulness of the phosphonate diester group for its intended function as a dispersing group. In a particularly preferred embodiment, "A" is a single methylene group. Without intending to be unduly limited thereby, it is believed that the length of the linking group can impact the ability of the phosphonate groups to function as a wetting agent because the wetting functionality of the phosphonate groups is dependent, at least in part, on its ability to form a chelating system in combination with the corresponding nitrogen atom in the backbone chain.

Preferably, the phosphonated and quaternized polyurethane polymer is formed by reaction of (a) a soft segment diol in which the hydroxy groups are separated by a flexible chain, (b) a hard segment diol in which the hydroxy groups are separated by a relatively inflexible chain, (c) a triol, (d) a diisocyanate, (e) a dialkyl phosphonate of the type described herein, and (f) a quaternary ammonium compound of the type described herein.

Soft Segment Diol
The soft segment diol is a diol in which the hydroxy groups are separated by a flexible chain. In a preferred embodiment, the soft segment diol is a diol having a molecular weight of more than 300, preferably 300 to 3000, more preferably 500 to 2500, and most preferably 1000 to 2000. Examples of suitable soft segment diols include TONE 210™ (a polycaprolactone diol available from Union Carbide), DESMOPHEN 2020E™ (a polycarbonate diol available from Bayer A.G) and RAVECARB 106™ (a polycarbonate diol available from Enichem America, Inc.)

Hard Segment Diol
The hard segment diol is a diol in which the hydroxy groups are separated by a relatively inflexible chain. Preferred hard segment diols are diols having a molecular weight of less than about 300. A typical example of a suitable hard segment diol is 2,2-dimethylpropane-1,3-diol, also known as neopentyl glycol (NPG).

TRIOL
A number of suitable triols are commercially available. A preferred triol is TONE 305™ (a polycaprolactone triol available from Union Carbide).
The triol provides the polyurethane with pendant hydroxy functional groups. For most applications, the polyurethane preferably has a hydroxy equivalent weight of from 500 to 10,000.

Diisocyanate
A number of suitable diisocyanates are commercially available. Exemplary diisocyanates suitable for use in the present invention include specifically, but not exclusively, toluene diisocyanate (TDI), 4,4-diphenylmethane diisocyanate (MDI) and isophorone diisocyanate (IPDI).

Dialkyl Phosphonate
The dialkyl phosphonate has the general formula:

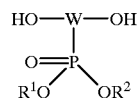

in which:
(A) W is a trivalent linking group, and
(B) $R^1$ and $R^2$ are as defined above.
In a preferred embodiment W is:

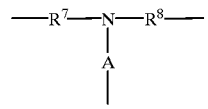

in which:
(A) $R^7$ and $R^8$ independently comprise a carbon chain of up to 6 carbon atoms, preferably, —$CH_2$—$CH_2$—, and
(B) A is as defined above.
$R^1$ and $R^2$ are preferably the same or different alkyl groups containing 1 to 5 carbon atoms or simple aryl groups containing 6 to 10 carbon atoms. More preferably, $R^1$ and $R^2$ are $C_2H_5$.

A preferred dialkyl phosphonate is diethyl bis-(2-hydroxyethyl) aminomethyl-phosphonate, available from AKZO under the trade name FYROL-6™.

The phosphonated polyurethane should generally have a phosphorus equivalent weight in the range 1,000 to 20,000, preferably 2,000 to 10,000.

Quaternary Ammonium Compound
Any of the commercially available quaternary ammonium compounds bearing at least one pendant groups capable of covalently bonding to an isocyanate (e.g., bearing a hydroxy functional group). For example, a quaternary ammonium compound bearing a single alkoxylated group would be effective for covalently bonding with the terminal NCO groups on the crosslinking agent, while one bearing multiple alkoxylated groups would also contribute additional hydroxy functionality to the resultant phosphonated and quaternized polyurethane polymer. A particularly suitable quaternary ammonium compound is a propoxylated quaternary ammonium chloride available from Witco Chemical Corp. under the designation EMCOL CC-9™. Alternatively, a comonomer having amino functionality susceptible to post-polymerization quaternization by an alkyl halide or similar reagent may be used.

The anion associated with the quaternary ammonium cation may be selected from any of the cations widely recognized as suitable for use with quaternary ammonium cations, including chloride and bromide.

The quaternized polyurethane should generally have a quaternary ammonium equivalent weight in the range of 20,000 to 40,000.

Magnetic Pigments

The magnetic pigment can be selected from any of the magnetic pigments known in the art, including specifically, but not exclusively, $\gamma$-$Fe_2O_3$, cobalt-doped $\gamma$-$Fe_2O_3$, $Fe_3O_4$, $CrO_2$, barium ferrite, barium ferrite derivatives, and metal particles.

Other Additives

In addition to the hard resin copolymer, soft resin component, and magnetic pigment, the magnetic layer can optionally include one or more conventional additives such as lubricants, abrasives, crosslinking agents, head cleaning agents, thermal stabilizers, antioxidants, dispersants, wetting agents, antistatic agents, fungicides, bactericides, surfactants, coating aids, nonmagnetic pigments, and the like, in accordance with practices known in the art.

Backside Coating

The optional backside coating may be formed from any of the polymeric binders known in the art, including the polymeric binder of the present invention. The backside coating may optionally also include a nonmagnetic pigment and/or one or more conventional additives dispersed within the polymeric binder.

Nonmagnetic Pigments

The nonmagnetic pigment can be selected from any of the nonmagnetic pigments known in the art, including specifically, but not exclusively, carbon black, $Al_2O_3$, and $TiO_2$.

The amount of nonmagnetic pigment incorporated within the backside coating can vary, but is preferably within the range from about 30 to 55 parts by weight, most preferably about 40 to 50 parts by weight, pigment based upon 100 parts (dried weight) backside coating.

Other Additives

In addition to the hard resin copolymer, soft resin component, and magnetic or nonmagnetic pigment, the backside coating can optionally include one or more conventional additives such as lubricants; abrasives; crosslinking agents; thermal stabilizers; antioxidants; dispersants; wetting agents; antistatic agents; fungicides; bactericides; surfactants; coating aids; and the like, in accordance with practices known in the art.

Magnetic Recording Media

Magnetic recording media of the present invention comprise a magnetic layer provided on a nonmagnetizable substrate wherein the polymeric binder of the magnetic layer includes the self-wetting phosphonated and quaternized polyurethane soft resin component described herein. The polymeric binder may optionally include a hard resin component and other typical additives. When the media is in the form of a tape, a backside coating may optionally be provided on the opposite side of the substrate.

Substrate

Suitable substrates include any of the substrate materials known in the art, including specifically, but not exclusively: polymers such as polyethylene terephthalate, polyimide, and polyethylene naphthenate; metals such as aluminum or copper; and paper.

Method of Coating Magnetic Layer and/or Backside Coating

A magnetic layer and/or backside coating of the present invention can be conveniently compounded as a dispersion and coated by conventional methods known in the art to be suitable for coating dispersions. For example, the magnetic layer and/or backside coating can be formed by (i) dispersing the ingredients of the magnetic layer or backside coating in a suitable dispersion medium, (ii) agitating the dispersion to form a substantially homogeneous dispersion, and (iii) coating the dispersion onto a substrate by a conventional coating method, such as gravure coating techniques, hydropneumatic coating techniques, and the like.

Generally, any crosslinker or catalyst used in the formulation are blended into the dispersion just prior to coating of the dispersion onto the substrate.

The dispersion can be coated at various thicknesses, with useful dry caliper values of the coating generally within the range of from about 0.5 to 1.5 $\mu$m, preferably about 1 to 1.25 $\mu$m.

The coated substrate can then be passed through a drier, optionally calendered, and allowed to cure. If radiation curable materials are used in the backside coating, the coating can also be exposed to a suitable source of radiation, e.g., electron beam radiation. In the case of a magnetic layer, the coated substrate can be passed through a magnetic field prior to calendering in order to randomize or orient the magnetic pigment as desired.

Curing of the coating can be accomplished in a variety of ways. As one approach, an isocyanate crosslinking agent can be added to the dispersion just before the dispersion is coated onto the substrate. As soon as the isocyanate crosslinking agent is added to the dispersion, the NCO groups of the isocyanate crosslinking agent will begin to react with the hydroxyl groups on the polymeric binder. In certain situations, such as the manufacture of magnetic tape recording media, a catalyst such as dibutyltin dilaurate can also be added in catalytic amounts to facilitate crosslinking. Generally, the addition of about 0.02 to 0.2 parts by weight catalyst per 100 parts by weight magnetic pigment is effective.

Suitable isocyanate crosslinking agents include polyfunctional isocyanates having an average functionality of at least two isocyanate groups per molecule. Examples of specific polyfunctional isocyanates useful as an isocyanate crosslinking agent in the practice of the present invention include specifically, but not exclusively, the commercially available polyfunctional isocyanates sold under the marks MONDUR CB55N™ and MONDUR-MRS™ available from Miles, Inc.; DESMODUR L™ available from Bayer A.G.; CORONATE L™ available from Nippon Polyurethane Ind., Ltd.; and PAPI™ available from Union Carbide Corp.

The isocyanate crosslinking agent is preferably used in an amount such that the molar ratio of NCO groups from the isocyanate crosslinking agent to the total number of available hydroxy groups from the hydroxy functional polymer is between about 0.3 and 5, more preferably between about 0.5 to 1.5.

As another approach, when one or more components of the polymeric binder contain radiation curable moieties, the dried coating can be irradiated to achieve curing of the radiation curable materials. Those skilled in the art, given the present teaching, will appreciate the manner in which irradiation can be achieved using any type of ionizing radiation that is capable of penetrating the pigment, such as electron beam ("e-beam") radiation. Preferably, radiation curing is achieved with an amount of electron beam radiation in the range from 1 to 20 Mrads, preferably 4 to 12 Mrads, and more preferably 5 to 9 Mrads of electron beam radiation having an energy in the range from 100 to 400 kev, preferably 200 to 250 keV.

Electron beam irradiation of the coating can be conducted under ambient conditions, but is preferably conducted under an inert atmosphere in order to keep ozone levels to a minimum and increase the efficiency of curing. A preferred inert atmosphere is a nitrogen atmosphere having an oxygen content of less than 75 parts per million.

The use of radiation curing techniques may offer some advantages over isocyanate curing techniques. Whereas isocyanate curing of magnetic media is not chemically selective and highly dependent on such variables as temperature and humidity, radiation curing techniques are generally less sensitive to the processing conditions of temperature and humidity. Moreover, radiation curing techniques allow one to control, to a certain extent, which polymers become crosslinked and which polymers do not become crosslinked. For instance, when the polymeric binder includes a polyurethane polymer having a pendant radiation curable moiety and a nonhalogenated vinyl copolymer having no pendant radiation curable moieties, the polyurethane polymer can be selectively cured by electron beam induced crosslinking of the radiation curable moiety. It is noted, however, that experimental evidence suggests that the vinyl copolymer may nevertheless undergo some crosslinking upon exposure to e-beam irradiation. It is known, for instance, that styrene-acrylonitrile copolymers undergo crosslinking during E-beam exposure.

Traditionally, radiation curable formulations have most commonly relied upon the reactivity of acrylates, methacrylates, and the like to achieve radiation-induced crosslinking. Unfortunately, magnetic dispersions prepared from such materials tend to undergo unwanted crosslinking reactions under ambient conditions to form gels, particularly when the magnetic pigment is a metal particle pigment. These dispersions are especially prone to suffer from undesirable crosslinking during dispersion milling.

However, because radiation curable polymers having dispersing groups are capable of wetting the pigment and facilitating homogeneous dispersion of the pigment throughout the polymeric binder, it is desirable to include at least some of such polymers in the milling step. In order to accomplish this, radiation curable (meth)acrylate groups can be replaced (in the manner provided in U.S. Pat. No. 5,510,187) by allyloxy groups (—O—CH$_2$—CH=CH$_2$), or α-methyl styrene moieties of the formula:

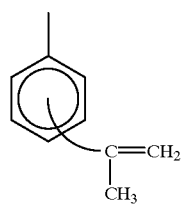

EXAMPLES

Glossary

Provided below in Table One is a Glossary of the acronyms and trademarks used in the examples.

TABLE ONE

| TERM | DESCRIPTION |
|---|---|
| 4NBA | 4-nitrobenzoic acid |
| BStearate | Butyl Stearate |
| DBTDL | Dibutyltin dilaurate |
| EMCOL CC-9 ™ | A propoxylated quaternary ammonium chloride available from Witco Chemical Corporation. |
| FYROL-6 ™ | Diethyl N,N-bis(2-hydroxyethyl)amminoethyl-phosphonate available from Akzo Chemicals. |
| MP | Metal Particle |
| MAcid | Myristic Acid |
| MEK | Methyl ethyl ketone |
| MIBK | Methyl isobutyl ketone |
| NHVC | Nonhalogenated Vinyl Copolymer containing (i) 72.4 wt % styrene, (ii) 24.1 wt % acrylonitrile, (iii) 2.5 wt % 2-hydroxy propyl acrylate, and (iv) 1 wt % methacryloxy oxyethyl trimethyl ammonium chloride. |
| NPG | Neopentyl Glycol |
| QPHPU | Quaternized and Phosphonated Polyurethane |
| RAVECARB 106 ™ | A polycarbonate diol available from Enichem America, Inc. |
| Solvent Blend | Blend of MEK/THF/MIBK at a weight ratio of 4:3:3 |
| THF | Tetrahydrofuran |
| TONE 0305 ™ | A polycaprolactone triol available from Union Carbide Corporation. |

Testing Procedures

SURFACE GLOSS (45° GLOSS)

Surface gloss is a measure of the refractive index and roughness of a surface. High values of surface gloss are indicative of well dispersed pigment coatings. Surface gloss was measured at a 45° angle using a Gardner gloss meter and reported as a percentage of the source light reflected by the surface.

COERCIVITY (Hc)

Coercivity measures the strength of the magnetic field required to switch the magnetization of the magnetic particles in the coating measured in Oe. Magnetic measurements were obtained using a LDJ M-H Meter operating at 5,000 Oe and 50 Hz for Examples 3 and 4, and operating at 6,000 Oe and 60 Hz for Examples 5 and 6. Coercivity was measured five times.

SQUARENESS (SQ)

Squareness is the ratio of the magnetic flux remaining after removal of an applied magnetic field to the magnetic flux present at an applied saturating magnetic field. Magnetic measurements were obtained using a LDJ M-H Meter operating at 6,000 Oe and 60 Hz.

SURFACE SMOOTHNESS (SS)

Surface smoothness was measured on a Wyko RST optical interferometer. Results are reported in nm root mean square average (Rq) and the difference between maximum peak and minimum valley (Rt) within the field of view.

TAPE RECORDING DENSITY (RMS OUTPUT)

Output measurements in dB were made on a Dual Deck Drumtester having separate stationary read and write heads positioned 180° relative to one another. A sample tape, fixed to the rim of the drum, is rotated at 0–2,685 rpm and contacted by the read and write heads. A recess is provided in the drum at the point of contact between the tape and each head, with the tape supported by a cushion of air. The Metal in Gap heads have an effective gap of 0.25μm, a trackwidth of 25 μm, a Bs=1.5T and 19 turn coils. Write current (0–200 mA0-p) and write frequency (0–7 Mfc/m) are adjusted during a single rotational write cycle. Output spectra is collected by a read after write process and analyzed. Results are reported relative to the dB of a commercially available reference tape (Fuji Hi8 DC™ Tape).

VISCOSITY (μ)

Dispersion viscosity was measured using an ICI viscometer operated at 10,000 reciprocal seconds.

Example 1
(Synthesis of QPHPU)

Into a reaction vessel containing 3 liters of MEK was added NPG (141.12 g), RAVECARB 106™ (460.4 g), and FYROL-6™ (80g) to form a first solution. The first solution was held under a steady flow of nitrogen and heated to reflux to remove water from the first solution, with 1 liter of distillate collected. The balance of the first solution was allowed to cool to around 50° C. and 4,4'-methylene bis (phenylisocyanate) (572.8 g), along with ten drops of DBTDL, was added to the solution to form a reaction mixture. The reaction mixture was held under a steady flow of nitrogen and heated to reflux for 1½ hours.

Into a separate vessel containing 320 ml of toluene was added EMCOL CC-9™ (37.28 g) to form a second solution. The second solution was heated to reflux to remove water from the solution, with 160 ml of distillate collected. The balance of the second solution was added to the reaction mixture, and the reaction mixture maintained at about 80° C. for 30 minutes.

Into a separate vessel containing 740 ml of MEK was added TONE 0305™ (313.6 g) to form a third solution. The third solution was added to the reaction mixture, and the reaction mixture maintained at about 80° C. for 1 hour, after which no residual isocyanate could be detected.

The final polymer had an inherent viscosity of 0.30 dl/g, a calculated phosphorus equivalent weight of 5,000, and a calculated quaternary ammonium equivalent weight of 28,000.

Example 2 (Comparative)
(Synthesis of PHPU)

Into a reaction vessel containing 1.2l of MEK was added NPG (72 g), RAVECARB 106™ (234.78 g), and FYROL-6™ (40.8 g) to form a first solution. The first solution was held under a steady flow of nitrogen and heated to reflux to remove water from the first solution, with 400 ml of distillate collected. The balance of the first solution was allowed to cool to around 40° C. and approximately 0.5 ml of DBTDL added to the solution.

Into a separate vessel containing 300 ml of MEK was added 4,4'-methylene bis(phenylisocyanate) (292.42 g) to form a second solution. The second solution was added to the reaction mixture, along with an additional 200 ml of MEK, and the reaction mixture held under a steady flow of nitrogen and heated to reflux for 2 hours.

Into a separate vessel containing 200 ml of MEK was added TONE 0305™ (160 g) to form a third solution. The third solution was added to the reaction mixture, and the reaction mixture maintained under a steady flow of nitrogen and reflux continued for an additional ½ hour, after which no residual isocyanate could be detected.

The final polymer had a calculated phosphorus equivalent weight of 5,000.

Examples 3 and 4
(Formation and Testing of Magnetic Layers for Magnetic Recording Media)

Into a steel container containing 80 g of ceramic or zirconia milling media (1–1½ mm diameter particles) was added a magnetic pigment, a surface modifying agent predissolved in Solvent A, and a lubricant. The container was sealed and the pigment mixture was shaken using a Red-Devil™ paint shaker for 30 minutes. A solution of a soft polyurethane resin in Solvent C was added to the pigment mixture and the mixture again shaken for an additional 30 minutes to form a dispersion. The dispersion was then removed from the container, the dispersion screen separated from the milling media, and the viscosity of the dispersion tested.

The dispersion was knife coated onto a polyester backing film at a coating thickness of between 100 microinches and 500 microinches and the magnetic particles magnetically aligned by pulling the coated film through an arrangement of magnetically repelling, permanent magnets having a longitudinal magnetic field of 1.3 kOe immediately after knife coating of the dispersion onto the film.

The coating was allowed to dry under ambient conditions for at least ½ hour, after which one or more surface characteristics and/or bulk magnetic and electromagnetic performance characteristics of the coating was tested without calendering of the coating.

The specific types and amounts of surface modifier, soft polyurethane resin, lubricant, and solvents A and C used to form the dispersion of each example is set forth in Table Two, wherein a notation of "- - -" indicates that the specified component was not incorporated into the dispersion. The percent solids at coating, and the tested values of inherent viscosity, surface characteristics and bulk magnetic and electromagnetic performance characteristics of each example, are reported in Table Three, wherein a notation of "- - -" indicates that the specified characteristic was not tested.

Examples 5 and 6
(Formation and Testing of Magnetic Layers for Magnetic Recording Media)

Into a container containing ceramic milling media (≈1 mm diameter particles) was sequentially added solvent A, a surface modifying agent, and a magnetic pigment,. The pigment mixture was mixed using a double planetary, and solutions of a hard vinyl resin in Solvent B and a soft polyurethane resin in Solvent C was added to the pigment mixture under constant mixing until a paste was formed. The paste was then mixed for 2 hours. The balance of the hard vinyl resin in Solvent B and soft polyurethane resin in Solvent C was then added to the mixture along with myristic acid (lubricant), aluminum oxide (cleaning agent) and additional solvent A, under constant mixing with a Shar™ mixer to form a final mixture with a solids content of about 40%. The final mixture was removed from the container, screen separated from the milling media, and charged into a sand-mill. The final mixture was milled in the sandmill until smooth, with the addition of butyl stearate (lubricant) to form a dispersion. Prior to coating, a crosslinking agent was added to the dispersion, along with sufficient additional solvent to reduce the solids content to about 25%.

The dispersion was coated onto a 6.5 micron thick polyethylene terephthalate backing film at a coating thickness of between 100 microinches and 500 microinches, a conventional backside coating of carbon black applied to the film, and the magnetic particles magnetically aligned by pulling the coated film through an arrangement of magnetically repelling, permanent magnets immediately after coating of the dispersion onto the film.

The coating was allowed to dry under ambient conditions, calendered and cured using conventional techniques. The surface characteristics and/or bulk magnetic and electromagnetic performance characteristics of the cured coating was tested.

The specific types and amounts of magnetic pigment, surface modifier, hard vinyl resin, soft polyurethane resin, head cleaning agent, lubricant, crosslinking agent and solvents A, B and C used to form the dispersion of each example is set forth in Table Two, wherein a notation of "- - -" indicates that the specified component was not incorporated into the dispersion. The percent solids at coating, and the tested values of inherent viscosity, surface characteristics and bulk magnetic and electromagnetic performance characteristics of each example, are reported in Table Three, wherein a notation of "- - -" indicates that the specified characteristic was not tested.

TABLE TWO (Dispersion Composition)

| | PIGMENT | | Surface Modifier | BINDER | | | | Xlinking Agent | Head Agent | Lubricant |
|---|---|---|---|---|---|---|---|---|---|---|
| | | | | Hard Resin | Solvent B | Soft Resin | Solvent C | | | |
| Example | MP wt % | Solvent A Type | Type wt % | Type wt % | Type wt % | Type wt % | Type wt % | Type wt % | Type wt % | Type wt % |
| 3 (Comp) | 85% | THF | 4 NBA 1.7 | — | — | PHPU 10.7 | MEK | — | — | MAcid 1.7 BStearate 0.9 |
| 4 | 85% | THF | 4 NBA 1.7 | — | — | QPHPU 10.7 | MEK | — | — | MAcid 1.7 BStearate 0.9 |
| 5 (Comp) | 79% | Solvent Blend | 4 NBA 1.4 | NHVC 3.5 | Solvent Blend | PHPU 5.2 | Solvent Blend | Isocyanate 2.6 | Aluminum Oxide 5 | MAcid 1.5 BStearate 0.8 |
| 6 | 79% | Solvent Blend | 4 NBA 2.4 | NHVC 3.5 | Solvent Blend | QPHPU 5.2 | Solvent Blend | Isocyanate 2.6 | Aluminum Oxide 5 | MAcid 1.5 BStearate 0.8 |

TABLE THREE (Properties and Charcteristics of Dispersions)

| Example | % Solids at Coating | Viscosity (cps) | 45°Gloss | SURFACE SMOOTHNESS | | Hc (Oe) | Sq | RMS Output @ 114 kfci (dB) |
|---|---|---|---|---|---|---|---|---|
| | | | | Rt (nm) | Rq (nm) | | | |
| 3 (Comp) | ~30 | 16 | 6.0[1] | — | — | 1983 | 0.63 | — |
| 4 | ~25 | 16 | 36.8[1] | — | — | 2057 | 0.75 | — |
| 5 (Comp) | ~25 | 6 | 187[2] | 62.3 | 6.3 | 2221 | 0.84 | +4.2 |
| 6 | ~25 | 6 | 186[2] | 55.3 | 7.1 | 2214 | 0.81 | '4.6 |

[1]Measured Before Calendering
[2]Measured After Calendering

Conclusion

Examples 3 and 4 indicate that dispersions containing QPHPU are of superior dispersion quality as demonstrated by the significantly improved 45° Gloss and Sq relative to dispersions containing PHPU. Examples 5 and 6 indicate that tapes formed with dispersions containing QPHPU provide superior electromagnetic recording performance relative to tapes formed with dispersions containing PHPU as demonstrated by the higher RMS Output at 114 kfci.

What is claimed is:

1. A magnetic recording medium comprising:
  (a) a nonmagnetizable substrate having a first major surface and a second major surface, and
  (b) a magnetic layer provided upon the first major surface of the substrate, the magnetic layer including at least:
    (1) a magnetic pigment, and
    (2) a polymeric binder system including a polyurethane having (i) a plurality of pendant phosphonate ester groups effective for promoting wetting of the magnetic pigment by the polymeric binder system, and (ii) at least one quaternary ammonium group effective for promoting wetting of the magnetic pigment by the polymeric binder system.

2. The magnetic recording medium of claim 1 wherein the polymeric binder system further includes a resin selected from the group consisting of vinyl chloride and vinylidene chloride.

3. The magnetic recording medium of claim 1 wherein the polymeric binder system further includes a nonhalogenated vinyl copolymer having (i) a plurality of pendant nitrile groups (ii) a plurality of pendant hydroxy groups, and (iii) at least one quaternary ammonium group.

4. The magnetic recording medium of claim 3 wherein the nonhalogenated vinyl copolymer includes:
  (a) 5 to 40 parts by weight (meth)acrylonitrile,
  (b) 30 to 80 parts by weight nonhalogenated, nondispersing, vinyl monomer, (c) 1 to 30 parts by weight nonhalogenated, hydroxy functional, vinyl monomer, and (d) 0.25 to 10 parts by weight of a nonhalogenated, vinyl monomer bearing a dispersing group.

5. The magnetic recording medium of claim 1 further comprising a nonmagnetic layer provided upon the second major surface of the substrate, wherein the nonmagnetic layer includes at least:

(a) a nonmagnetic pigment, and (b) a polymeric binder system.

6. The magnetic recording medium of claim 5 wherein the polymeric binder system of the nonmagnetic layer includes a polyurethane having (i) a plurality of pendant phosphonate ester groups effective for promoting wetting of the nonmagnetic pigment by the polymeric binder system, and (ii) at least one quaternary ammonium group effective for promoting wetting of the nonmagnetic pigment by the polymeric binder system.

7. The magnetic recording medium of claim 6 wherein the polymeric binder system of the nonmagnetic layer further includes a nonhalogenated vinyl copolymer having (i) a plurality of pendant nitrile groups (ii) a plurality of pendant hydroxy groups, and (iii) at least one quaternary ammonium group.

8. The magnetic recording medium of claim 6 wherein the polymeric binder system of the nonmagnetic layer further includes a resin selected from the group consisting of vinyl chloride and vinylidene chloride.

9. The magnetic recording medium of claim 5 wherein the nonmagnetic pigment is selected from the group consisting of carbon black, $Al_2O_3$, and $TiO_2$.

10. The magnetic recording medium of claim 5 wherein the nonmagnetic pigment is present in an amount from about 30 to 55 parts by weight based on the dried weight of the nonmagnetic layer.

11. The magnetic recording medium of claim 1 wherein the magnetic pigment is selected from the group consisting of $\gamma\text{-}Fe_2O_3$, cobalt-doped $\gamma\text{-}Fe_2O_3$, $Fe_3O_4$, $CrO_2$, barium ferrite, barium ferrite derivatives, and metal particles.

12. The magnetic recording medium of claim 1 wherein the magnetic pigment is present in an amount from about 70 to 95 parts by weight based on the dried weight of the magnetic layer.

13. The magnetic recording medium of claim 1 wherein the phosphonate ester groups are phosphonate diester groups having the formula:

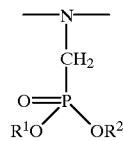

in which: (i) the nitrogen atom forms part of the backbone chain of the polymer, and (ii) $R^1$ and $R^2$ independently represent an alkyl group, cycloalkyl group, an aryl group or together comprise the necessary carbon atoms to complete a ring.

14. The magnetic recording medium of claim 1 wherein the quaternary ammonium groups have the formula:

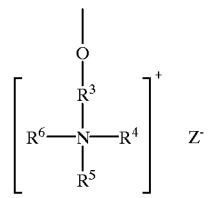

in which (i) $R^3$ is a divalent carbon-containing chain, (ii) $R^4$, $R^5$ and $R^6$ independently represent an alkyl group, a cycloalkyl group, an aryl group, and an arylalkyl group, preferably an alkyl group containing 1 to 4 carbon atoms, and(iii) $Z^-$ represents an anion.

* * * * *

UNITED STATES PATENT AND TRADEMARK OFFICE
CERTIFICATE OF CORRECTION

PATENT NO. : 6,139,982
DATED : October 31, 2000
INVENTOR(S) : Bottomley et al.

It is certified that error appears in the above-identified patent and that said Letters Patent is hereby corrected as shown below:

Column 5:
Line 60, "-$N^+(CH_3)_2(CH_2CH_2CH_2SO_3^{31}$" should be --$N^+(CH_3)_2(CH_2CH_2CH_2SO_3$--.

Column 17/18:
TABLE TWO, Example 5(Comp), under the Surface Modifier" column, wt% "1.4" should be --2.4--

Column 17/18:
TABLE THREE, Example 4, under the "% Solids at Coating" column, ~25" should be ---~30--.

Column 17/18:
TABLE THREE, Example 6, under the "RMS Output" column, "'4.6" should be --+4.6--.

Signed and Sealed this

Twelfth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,139,982
DATED : October 31, 2000
INVENTOR(S) : Bottomley et al.

It is certified that error appears in the above-identified patent and that said Letters Patent is hereby corrected as shown below:

Column 5:
Line 60, "-$N^+(CH_3)_2(CH_2CH_2CH_2SO_3^{31}$" should be --$N^+(CH_3)_2(CH_2CH_2CH_2SO_3$--.

Column 17/18:
TABLE TWO, Example 5(Comp), under the Surface Modifier" column, wt% "1.4" should be --2.4--

Column 17/18:
TABLE THREE, Example 4, under the "% Solids at Coating" column, ~25" should be --~30--.

Column 17/18:
TABLE THREE, Example 6, under the "RMS Output" column, "'4.6" should be --+4.6--.

Signed and Sealed this

Twenty-sixth Day of June, 2001

Attest:

*Attesting Officer*

NICHOLAS P. GODICI
*Acting Director of the United States Patent and Trademark Office*